United States Patent [19]

Lee

[11] 3,971,877
[45] July 27, 1976

[54] REMOVABLE FILTERS ON ELECTRONIC CHASSIS AND METHOD OF ASSEMBLING SAME

[75] Inventor: Lawrence Y. Lee, Santa Ana, Calif.

[73] Assignee: Lawrence Y. Lee, Santa Ana, Calif.

[22] Filed: Sept. 29, 1975

[21] Appl. No.: 617,919

[52] U.S. Cl. .............................. 174/16 R; 29/450; 29/453; 24/DIG. 18; 55/491; 55/509
[51] Int. Cl.² ..................... H01B 7/34; H01B 9/06; H01G 3/03; H01G 5/10
[58] Field of Search ............................ 29/450, 453; 24/DIG. 18; 174/15 R, 16 R, 138; 55/491 X, 509 X

[56] References Cited
UNITED STATES PATENTS

| | | | |
|---|---|---|---|
| 2,991,843 | 7/1961 | Bell | 55/509 X |
| 3,067,756 | 12/1962 | Bruggink | 55/491 UX |
| 3,094,330 | 6/1963 | Smith | 55/491 UX |
| 3,364,838 | 1/1968 | Bradley | 174/16 R X |
| 3,499,102 | 3/1970 | Gellemot et al. | 174/138 |
| 3,608,280 | 9/1971 | Martin | 174/16 R X |
| 3,940,873 | 3/1976 | Lawless | 24/DIG. 18 |
| 3,941,159 | 3/1976 | Toll | 24/DIG. 18 |

Primary Examiner—Charlie T. Moon
Attorney, Agent, or Firm—Knobbe, Martens, Olson, Hubbard & Bear

[57] ABSTRACT

Open cell, air permeable filtering material is attached adjacent the air inlet passage of an electronic circuit chassis by means of a fastener including a plurality of extending barbed members which are semiresilient, the barbs of said fasteners attaching directly to the cells of said filter in response to the application of pressure therebetween, said barbs resiliently yielding to permit removal of said filter from said chassis.

11 Claims, 4 Drawing Figures

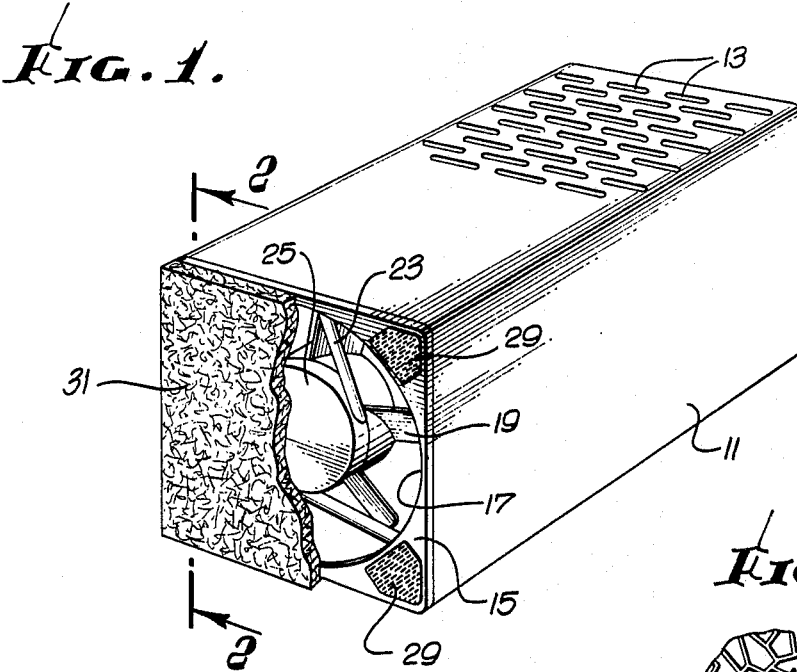
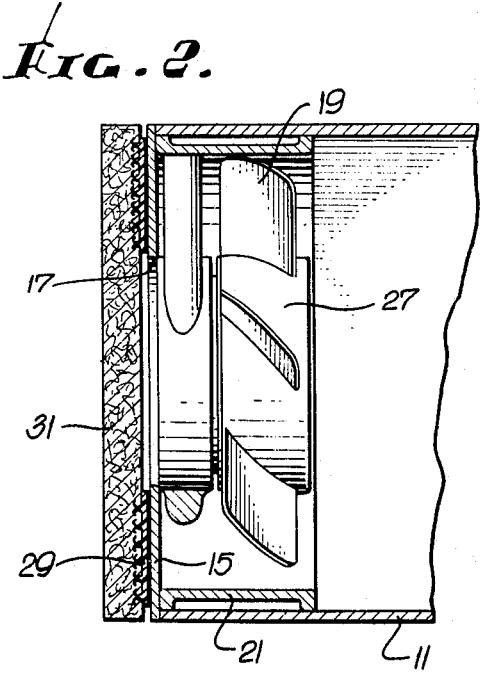
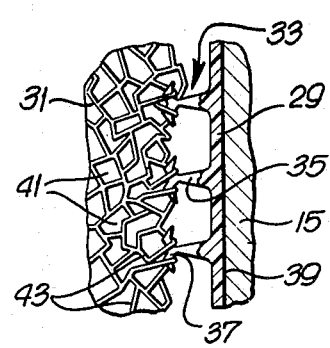
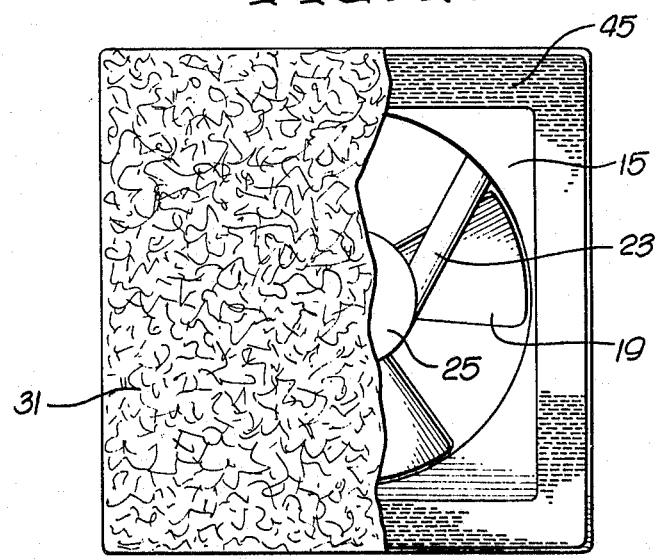

REMOVABLE FILTERS ON ELECTRONIC CHASSIS AND METHOD OF ASSEMBLING SAME

BACKGROUND OF THE INVENTION

The present invention relates to apparatus for attaching fibrous filtering materials to duct work, and more particularly to the attachment of such fibrous filter material to the air intake aperture of an electronic chassis, and specifically a chassis which is cooled by fan-forced air.

The majority of electronic chassis which include fans for forcing air circulation over electronic components for cooling such components include no air filtration system, so that impurities are drawn over the components. Such impurities gather on components within the electronic chassis, particularly in locations of partial air stagnation, and in time develop a film over the electronic components, heat sinks, and other elements. The result of such an impurity layer is a substantial reduction in the forced conduction heat dissipation from the elements, since this impurity layer offers a substantial thermal resistance between the components and the flow of cooling ambient air.

The primary reason for the failure of manufacturers to place proper filters on such chassis is the difficulty and expense of constructing a sheet metal enclosure for surrounding the perimeter of filter elements to support these elements and permit their removal for cleaning or replacement. Such sheet metal supporting structures inhibit the design of electronic chassis since they must extend beyond the normal chassis dimensions. In addition, since many chassis are drawer mounted in large consoles, it is often difficult to provide sufficient access to the rear of the chassis to permit filter replacement.

Even in those instances where manufacturers have gone to the expense, both in design and fabricating terms, to provide filtration systems on electronic chassis, the relative difficulty of removing filters for cleaning or replacement has resulted in the failure of operators and maintenance personnel to adequately maintain the filtration system. As a consequence, the filters are often left uncleaned for extended periods of time such that the filter becomes clogged and impedes airflow. This results in excessive temperatures within the electronic chassis which cause component failure. Alternatively, the filter is simply removed altogether so that, as explained above, a layer of impurities is permitted to build up on the components.

SUMMARY OF THE INVENTION

These and other difficulties encountered in prior art electronic chassis filtration systems are overcome through the use of the present invention which permits easy application and removal of filters from electronic chassis without expensive hardware supporting systems. At the same time, the present invention permits extremely inexpensive filters to be used on such electronic chassis so that the cost of replacing the filters is reduced. This economy increases the likelihood that users will maintain proper filtration on the electronic chassis.

These results are accomplished through the application of fastening strips around the periphery of the air inlet to the electronic chassis, the fastening strips consisting of adhesive backed sheets having numerous small plastic hooks, commonly obtained under the trade name "Velcro Fastener." While in a typical application, such Velcro fastener hooks are used as a male fastening element in conjunction with special pile material which operates as the female member of the hooking structure, the present invention utilizes the plastic hooks to attach directly to open cell, air permeable filtration material so that the filter unit itself need not have any extra attaching members. By placing the plastic hooked sheet material around the periphery of the air inlet to the electronic chassis, the filtration material may be cut to the proper size and simply pressed onto the chassis opening. Engagement between the numerous plastic hooks and the open cells of the filtration material then supports the filter. The plastic hooks or barbs themselves are somewhat resilient, as is the filtration material, such that removal of the filtration material from the chassis is accomplished by simply peeling the filter material from the hooked sheets without damaging either element. The filter, once removed, may be cleaned or may be replaced, and another filter may be attached to the electronic chassis by simply pressing the filter material onto the chassis opening. The present invention therefore provides for the easy replacement of extremely inexpensive filtering elements onto the electronic chassis, such that the resulting cost savings both in terms of maintenance labor and material costs substantially increases the likelihood that proper filtration will be maintained on the electronic equipment. This is a particular advantage to manufacturers marketing electronic products which are cooled by fan-forced conduction and which contain electronic components which would fail if not properly cooled. The inclusion of the filtration system of the present invention increases the likelihood of proper air circulation over such components and the resulting long life of the manufacturer's product.

These and other advantages of the present invention are best understood through a reference to the drawings, in which:

FIG. 1 is a perspective view of the filter and filter attachment elements of the present invention attached to a fanforced convection cooled electronic chassis, with the filter element partially broken away to show the fastening sheets;

FIG. 2 is a sectional view taken along lines 2–2 of FIG. 1;

FIG. 3 is an enlarged portion of the sectional view of FIG. 2 showing the interconnection between the hook elements and filter of the present invention; and FIG. 4 is an elevation view showing the filtered end of an electronic chassis using an alternate embodiment configuration for the fastener element.

DETAILED DESCRIPTION OF THE PREFERRED EMBODIMENT

Referring initially to FIGS. 1 and 2, an electronic chassis 11, typically formed as a rectangular sheet metal box, houses electronic components, typically on printed circuit boards (not shown). The chassis 11 in the embodiment shown includes a rear cover (not shown) which is closed except for necessary manual controls or connectors which extend through the chassis wall. The upper wall, as viewed in FIG. 1, includes plural through apertures 13 which permit air exhaust from the chassis 11. In addition, the chassis 11 includes a front cover 15 which includes a large aperture 17 which acts as the air inlet passage for the chassis 11. It should be understood that the electronic components within the chassis 11, as well as the printed circuit boards used for mounting these components, are arranged within the chassis 11 such that airflow between the aperture 17 and the plural apertures 13 is ducted to provide positive forced convection over any components which require forced convection cooling for long life.

A fan 19 is mounted by means of a fan housing 21 to the chassis 11 adjacent the front end wall 15. The fan housing 21 is typically connected by plural struts 23 to the stator portion 25 of the fan motor, while the rotor portion 27 of the fan motor directly supports the fan 19. Fans used for electronic chassis of this type typically include the motor as an inherent portion of the fan and are provided with electrical current from the electrical supply for the components within the chassis 11. The fan 19 draws air through the aperture 17 into the chassis 11. The air supply for this forced convection may be either ambient air or the air supply within a large electronic cabinet which supplies air to numerous chassis 11.

Four male Velcro fastener sheets 29 are attached adjacent the corners of the front plate 15 of the chassis 11 for mounting an open cell, air pervious filter element 31 having a lattice structure. The details of the fastener elements 29 and filter element 31 are best understood through a reference to FIGS. 2 and 3. In the embodiment shown, the fastener sheet 29 includes numerous protruding hook or barb members 33, each including an elongate extending shank portion 35 supporting an arrowhead shaped hook portion 37. The sheet 29, along with the portions 35 and 37, are formed of semiresilient polymeric material such that the hook portions 37 may yield slightly to permit removal of the filter element 31. The fastener 29 includes a layer of adhesive 39 which permits convenient attachment to the front cover 15 of the chassis 11. The fastener 29 may be obtained under the trade name "MVA-8 molded Velcro arrowhead tape." It will be understood by those familiar with such material that the Velcro fastener 29 is designed for use with a female Velcro member which is generally formed as a loop pile material attached to an air impervious adhesive backing for attachment to elements which are to be secured to the arrowhead sheet. Rather than using such an intermediate female fastening member, however, which would add to the complexity and cost of the filtration system, the fastener 29 of the present invention is used to interconnect directly with the filtration member 31. It has been found that this is possible by using a variety of foamed plastic materials for the filter elememt 31, each of which includes a relatively large cell structure, the cells being open to provide a lattice-like structure. A typical example of such material is sold under the trade name "PVC Coated Scott Industrial Foam" and is formed of polyvinylchloride coating on Scott Industrial Foam. This material adequately filters electronic components within the chassis 11 since it has a 100% open cell structure which provides adequate airflow while providing sufficient surface area for the collection of impurity particles. As shown in FIG. 3, the open cells 41 of this filter material 31 permit the arrowhead hooks 37 to penetrate within the filter 31 and additionally provide an interconnected lattice network 43 which is semiresilient and will slip over the arrowhead hook elements 37 when pressure is applied to the outer surface of the filter element 31. Thus, when a filter 31 is to be attached to the fasteners 29, it is placed over the opening 17 in the chassis 11 and pressure is applied to the filter 31 adjacent each of the fasteners 29. The lattice network 43 yields sufficiently to allow penetration of the arrowhead portions 37 and supporting shank portions 35 of the fastener 29 into the filter material 31. The arrowhead hook portions 37 are sufficiently rigid to hook portions of the lattice structure 43 as shown in FIG. 3 to retain the filter 31 on the front cover 15 on the chassis 11. When the filter 31 is to be removed, it is peeled away from the fasteners 29, the arrowhead portions 37 yielding sufficiently to allow the hooked portions of the lattice structure 43 to slip off of the end of the hooks 33 to permit such removal. The replacement of a filter element 31 thus requires only the peeling of the old filter 31 from the cover 15 and the pressing of a new filter element 31 onto the fasteners 29.

The embodiment shown in FIG. 4 may be utilized to assure that no voids exist between the periphery of the filter element 31 and the front face 15 of the chassis 11. In this embodiment, the Velcro fastener sheet 45 is attached, as by adhesive, to surround the entire periphery of the front cover 15. The filter material may be attached by application of pressure around its entire periphery so that no air is permitted to enter the chassis 11 except through the interstices of the filter element 31.

It should be particularly noted that the male Velcro fastener in this instance has been utilized to connect directly to the air pervious filter medium 31 without the use of a common female Velcro fastener, which substantially reduces the complexity and cost of the filtration system. It should also be noted that the open cell foam material 31 used for filtering may be purchased in large sheets and simply cut to the desired size and shape by maintenance personnel for direct attachment to various electronic chassis 11 being maintained. This permits the maintenance of various sized filters without requiring a large inventory of various filter sizes The use of this invention therefore substantially increases the likelihood that electronic chassis 11 will be properly filtered during their entire usable life and that the usable life will thereby be extended by assuring adequate fan-forced conduction flow over the electronic components at all times and simultaneously assuring that polluting particles will not be admitted to the chassis 11.

What is claimed is:
1. Apparatus for cooling electronic components, comprising:
    a chassis surrounding said components and including an air inlet and an air outlet;
    a fan mounted within said chassis to draw air from said air inlet, over said electronic components, and out of said air outlet;
    a fastener attached to the outside surface of said chassis adjacent said air inlet, said fastener comprising:
        a thin sheet member attached to the outside surface of said chassis; and
        plural hooked members connected to and extending from said sheet member; and
    an air permeable, open cell foam air filter having an interconnected lattice structure, individual lattices of said structure interconnecting with individual ones of said plural hooked members, said air filter covering said air inlet.
2. Apparatus for cooling electronic components as defined in claim 1 wherein said plural hooked members are formed of semiresilient material to permit said hooked members to yield and thereby allow removal of said air filter from said hooked members.

3. Apparatus for cooling electronic components as defined in claim 1 comprising a plurality of said fasteners positioned at spaced locations surrounding said air inlet.

4. Apparatus for cooling electronic components as defined in claim 1 wherein said fastener extends around the entire periphery of said air inlet to prohibit voids between said chassis and said filter.

5. Apparatus for cooling electronic components as defined in claim 1 wherein said fastener comprises a male Velcro fastener.

6. Apparatus for attaching an air permeable, open cell filter element having an interconnected lattice structure over the air inlet passage of a fan-forced convection cooling electronic chassis, comprising:
   a flat sheet member attached to said electronic chassis adjacent said air inlet passage; and
   plural semiresilient hook members protruding from said flat sheet member on the side opposite said chassis, said hook members positioned within the interstices of said open cell filter element and engaging said lattice structure.

7. Apparatus for attaching an air permeable, open cell filter element as defined in claim 6 wherein said plural semiresilient hook members are sufficiently resilient to extend under tension to allow removal of said filter element from said hook members without damaging either said filter element or said hook members.

8. Apparatus for attaching an air permeable, open cell filter as defined in claim 6 wherein said sheet member and said hook members are formed as a unitary element.

9. Apparatus for filtering air supplied by a fan to an electronic chassis through an air inlet opening, comprising:
   an open cell filter element covering said air inlet opening; and
   a fastener element attached to said chassis adjacent said air inlet opening, said fastener element including plural hooks protruding opposite said chassis, said hooks penetrating and interconnecting with said open cells of said filter element directly, without the interposition of a second fastener element attached to said filter element.

10. A method of attaching an open cell filter element to the air inlet opening of a forced convection cooled electronic chassis, comprising:
    attaching a fastener having plural protruding hook members to said electronic chassis adjacent said air inlet opening;
    placing said open cell filter element over said air inlet opening in direct contact with said fastener; and
    applying pressure to said filter element to directly interengage said open cells and said plural hook members.

11. A method of attaching an open cell filter element as defined in claim 10 additionally comprising the preliminary step of:
    cutting a sheet of open cell filter material to provide a filter element slightly larger than said inlet opening.

* * * * *